Oct. 6, 1959
O. F. RUIZ
2,907,286
MACHINE FOR MAKING TORTILLAS
Filed Jan. 15, 1957
3 Sheets-Sheet 2
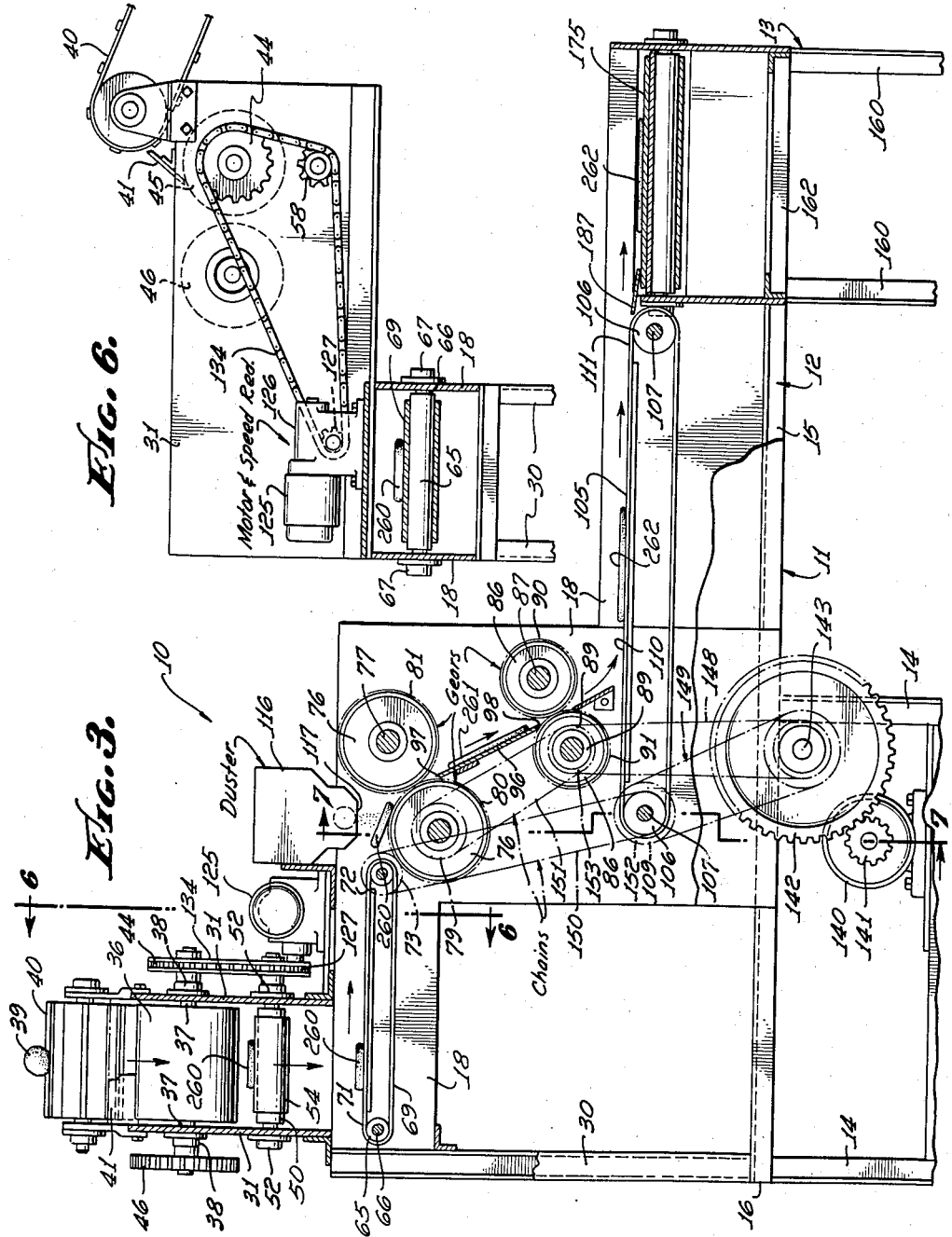
Oscar F. Ruiz,
INVENTOR.
HUEBNER, BEEHLER,
WORREL & HERZIG
ATTORNEYS
BY Richard M. Worrel

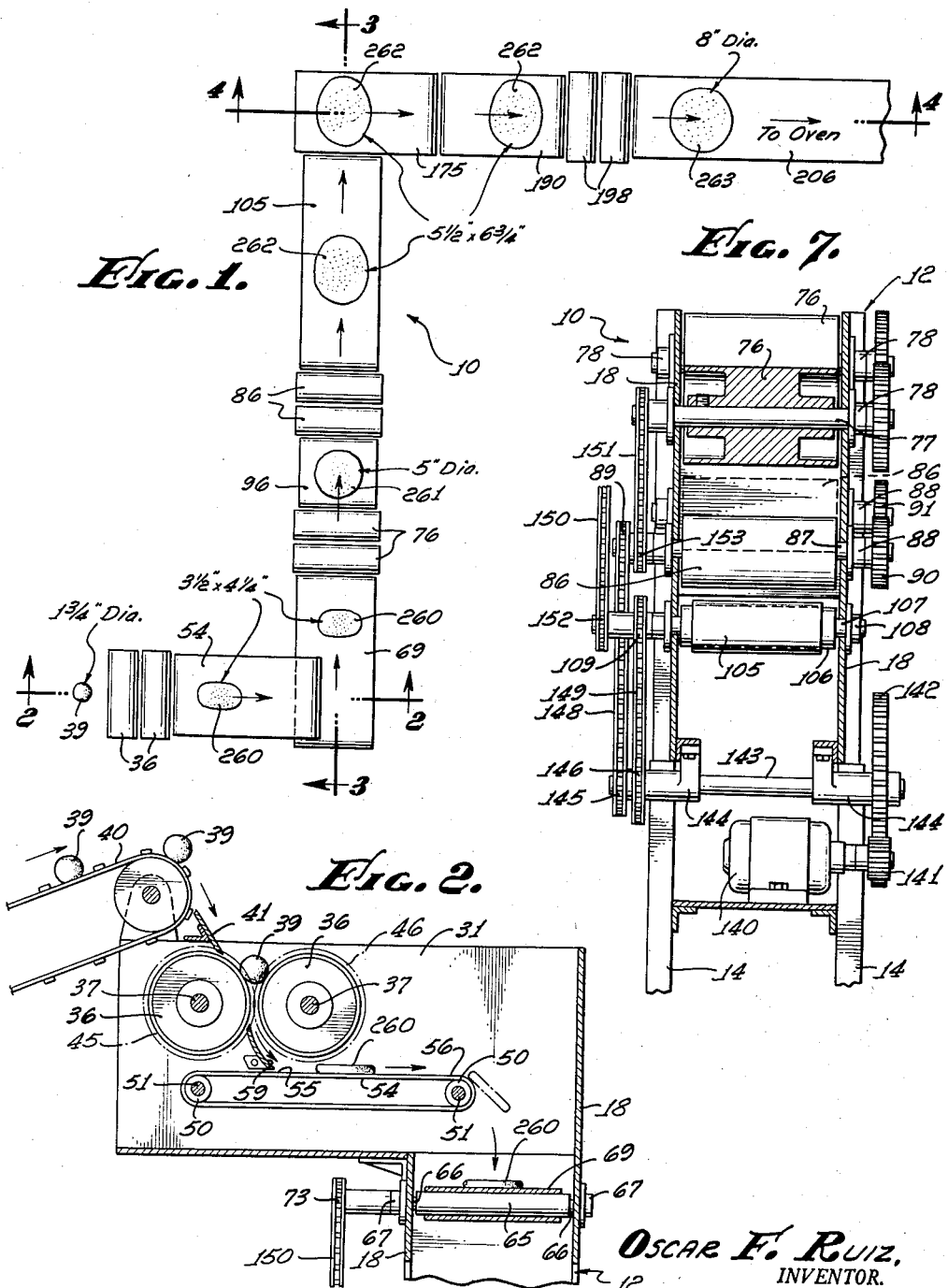

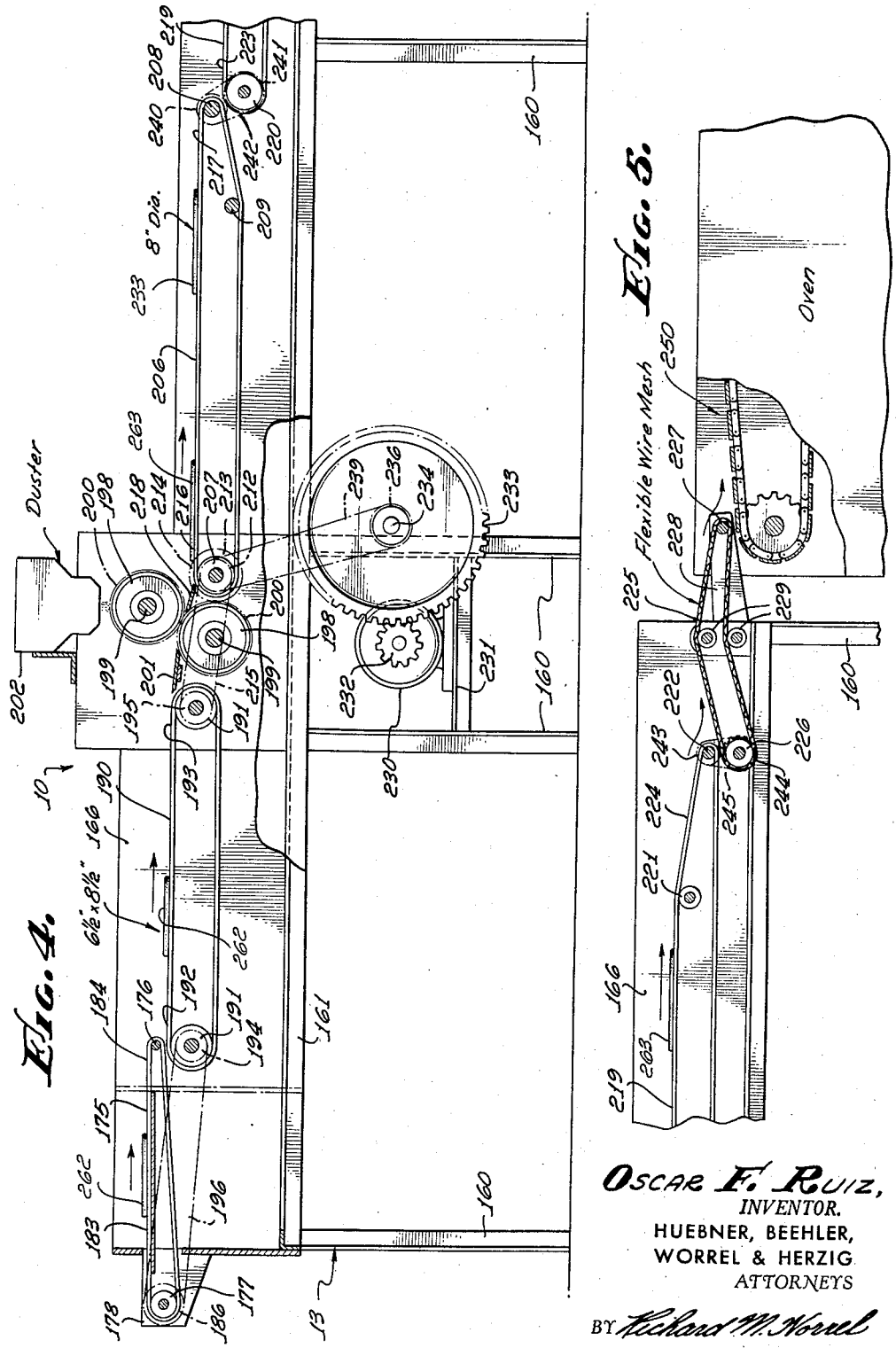

United States Patent Office 2,907,286
Patented Oct. 6, 1959

2,907,286

MACHINE FOR MAKING TORTILLAS

Oscar F. Ruiz, Tulare, Calif.

Application January 15, 1957, Serial No. 634,373

8 Claims. (Cl. 107—12)

The present invention relates to a dough forming machine and more particularly to a machine for making substantially uniform, circular, flat, thin tortillas from a mass of dough.

It is well-known that tortillas are thin, substantially circular, flat cakes of wheat or corn flour approximately one-eighth of an inch thick and from eight to ten inches in diameter. Although tortillas are a principal article of food for millions of people, the shaping of dough into thin sheets of conventionally circular, tortilla form has largely remained a hand operation. Aside from the potentially unsanitary aspects, the hand shaping of dough into tortillas is insatisfactory because of practical and economic problems involved particularly where the production is of commercial volume.

At one time chunks of dough were patted entirely by hand into wafers. This was very time consuming, frequently resulted in tearing of the dough, and often produced irregular shapes and jagged edges. There have been attempts to cut out patties from large sheets of dough but because of dough elasticity, this has not been satisfactory. This is particularly true of wheat flour dough which is quite elastic as compared to dough of corn flour. It has been more recently the practice to pass balls of dough through rolls to obtain some preliminary flattening. Then, workers positioned on opposite sides of a conveyor carrying the flattened pieces of dough attempt to stretch each piece into desired shape. Although this somewhat reduced labor, the tortillas were little improved in shape and uniformity. For various reasons, worker carelessness or inattention has caused considerable waste due to tearing, especially with wheat flour tortillas. More significantly, however, many of these hand formed tortillas are of such unusual shapes, differing from the conventional circular shape, as to cause the tortillas to lose much of their eye appeal and salability.

The subject invention is believed to minimize the escribed problems and to provide a highly satisfactory machine long sought after in the tortilla industry.

Accordingly, it is an object of the present invention to provide a machine for forming a thin, flat, substantially circular tortilla from a mass of dough.

Another object is to avoid the formation of tortillas by hand and to obviate the problems incident thereto.

Another object is to provide a machine for making tortillas of improved and substantially uniform texture, shape, thickness, and area.

Another object is to form tortillas having improved appearance and therefore greater sales appeal.

Another object is to reduce labor costs and other inefficiencies in the making of tortillas.

Another object is to minimize the time required to make tortillas.

Another object is to prevent the adhesion and curling of tortillas incident to passage from one conveyor to another in automatic tortilla forming apparatus.

Other objects are to provide a machine of the nature described which is simple and economical to manufacture, dependable in operation, durable in construction, and which is highly satisfactory for accomplishing its intended purposes.

These and other objects will become more fully apparent upon reference to the following description.

In the drawings:

Fig. 1 is a diagrammatic plan of a machine constructed in accordance with the principles of the present invention, and shows pieces of dough in successive stages of formation from a substantially spherical ball to a thin circular tortilla.

Fig. 2 is a fragmentary, vertical section taken through a machine constructed in accordance with the principles of the present invention along a plane at a position represented by line 2—2 in Fig. 1.

Fig. 3 is a fragmentary, vertical section, partially broken away, taken along a plane at a position represented by line 3—3 in Fig. 1.

Fig. 4 is a vertical section, partially broken away, taken along a plane at a position represented by line 4—4 in Fig. 1.

Fig. 5 is a fragmentary, vertical section, partially broken away, of a final conveyor and oven as employed in the subject invention.

Fig. 6 is a fragmentary, vertical section taken on a plane at a position represented by line 6—6 of Fig. 3.

Fig. 7 is a fragmentary, vertical section taken on a plane at a position represented by line 7—7 of Fig. 3.

Referring more particularly to the drawings, a tortilla forming machine is generally indicated by the numeral 10. The machine includes a support frame 11 which may be of any convenient construction. As illustrated, the frame includes a pair of generally right-angularly related rear and front sections 12 and 13, respectively. The rear section has a plurality of vertical legs 14 interconnected by upper longitudinal and transverse frame members 15 and 16. A pair of upper side panels 18 are mounted on the longitudinal frame members in spaced parallel relation. Pairs of posts 30 are extended upwardly from an end of the frame section 12 and are connected to the side panels 18. Mounting plates 31 are upwardly extended in spaced parallel relation from the panels in transverse outward extension relative to the panels as seen in Fig. 3.

A pair of substantially horizontal, primary sheeting rolls 36 have oppositely extended trunnions 37 rotatably mounted in bearings 38 in the mounting plates 31. The primary rolls are in closely adjacent spaced relation to each other for receiving substantially spherical dough balls 39 approximately one and three-quarters inches in diameter discharged from a supply conveyer 40 feeding into the primary rolls. A flat slide 41 extended between the plate guides the balls from the conveyer into the primary rolls. A driven sprocket 44 is secured to the trunnion of one of the rolls; a drive gear 45 is secured to the oppositely extended trunnion on said roll; and a driven gear 46 in mesh with the drive gear is secured to the trunnion on the other roll adjacent to said oppositely extended trunnion.

Substantially horizontal rollers 50 provide oppositely extended pins 51 journaled in bearings 52 in the mounting plates 31. The rollers are in horizontally spaced relation below the primary rolls 36. An endless primary belt conveyer 54 is extended around the rollers for circuitous travel therearound and provides a receiving end 55 below the primary rolls and a discharge end 56 over and between the panels 18. A driven sprocket 58 is secured to one of the pins 51. An arcuate slide 59 is extended between the plates for guiding dough from the primary rolls onto the primary conveyer.

Further, substantially horizontal rollers 65 have oppositely extended pins 66 journaled in bearings 67 in the side panels 18. The rollers 65 are rotatable about the longitudinal axes which are perpendicular to the axes of rotation of the rollers 50 and are in horizontally spaced relation to each other below the primary conveyer 54. An endless, first intermediate belt conveyer 69 is extended around the rollers 65 for circuitous travel. The conveyer 69 has a receiving end 71 positioned below the discharge end 56 of the primary conveyer 54 for receiving dough discharged therefrom. The first intermediate conveyer also has a discharge end 71 generally located between the upstanding portions of the panels. A driven sprocket 73 is secured to one of the pins 66 adjacent to the discharge end of the conveyer 69.

A pair of first intermediate sheeting rolls 76 provide endwardly extended trunnions 77 rotatably supported in bearings 78 in the panels 18. The first intermediate rolls are positioned below the discharge end 72 of the first intermediate conveyer 69 for receiving dough discharged therefrom. The intermediate rolls rotate about axes which lie in a common plane slightly endwardly inclined at the discharge end of the conveyer 69. A driven sprocket 79 is secured to one of the trunnions 77; a drive gear 80 is secured to the trunnion at the opposite end of the trunnion to which the driven sprocket is secured; and a driven gear 81 is mesh with the gear 80 is secured to the adjacent trunnion of the other intermediate roll 76.

A pair of second intermediate sheeting rolls 86 also have endwardly extended trunnions 87 journaled in bearings 88 in the panels 18. As before, one of the trunnions has a driven sprocket 89 thereon, and meshing drive and driven gears 90 and 91 are connected to the trunnions at the opposite ends of the rolls from the sprocket. The second intermediate rolls are spaced downwardly and forwardly from the upper rolls 76 and rotate on axes lying in a plane substantially parallel to the plane of the axes of the upper rolls 76.

A flat inclined chute 96 is mounted between the panels 18 so that an upper edge 97 thereof is subjacent to the upper rolls 76, and the lower edge 98 thereof and immediately above the lower rolls 86. In this manner dough slides down the chute after passing through the upper rolls and is guided thereby into the lower rolls.

A lower intermediate belt conveyer 105 is extended around rollers 106 having pins 107 journaled in bearings 108 in the lower horizontal portion of the panels 18. A driven sprocket 109 is secured to one of the pins. The lower conveyer has a receiving end 110 located below the lower intermediate rolls 86, and a discharge end 111.

A duster 116 is mounted in the frame 11 above the upper intermediate rolls 76 and provides a downwardly disposed spout 117 for releasing flour downwardly onto the upper rolls. It will be understood that similar dusters may be utilized with each set of rolls, if desired.

A motor 125 and a gear reduction unit 126 are mounted on the support frame 11 on the side panels 18. The latter has an output sprocket 127. A chain 134 is extended around the sprocket 127 and the driven sprockets 44 and 58 for imparting rotary movement to the primary rolls 36 and the primary conveyer 54.

Another motor 140 is mounted in the support frame 11 on the legs 14 and has a spur gear 141 in mesh with a larger wheel gear 142 connected to a shaft 143 journaled in bearings 144 in the frame. Drive sprockets 145 and 146 are secured to the shaft, and chains 148 and 149 are individually extended around the drive sprockets and the driven sprockets 89 and 109 of the lower intermediate rolls 86 and the lower intermediate conveyer 105 so as to impart rotation thereto. Chains 150 and 151 are individually extended around sprockets 152 and 153, and sprockets 73 and 79, respectively.

The front section 13 of the support frame 11 also provides a plurality of pairs of legs 160 interconnected by upper longitudinal and transverse frame members 161 and 162. Side panels 166 are upwardly extended from the longitudinal frame members in spaced parallel relation.

A transfer belt conveyer 175 is extended around a small diameter roller 176 journaled for rotation in the side panels 166 and a larger roller 177 journaled for rotation in brackets 178 outwardly extended from the side panels 166. The smaller roller is located slightly above the lower roller. The transfer conveyer provides an upper run in a substantially horizontal plane slightly below the plane of the upper run of the lower intermediate conveyer 105 and has a receiving end 183 adjacent to the discharge end 111 of the lower conveyer so as to receive dough discharged therefrom. The transfer conveyer has a discharge end 184 between the panels 166 and a driven sprocket 186 is connected to the larger roller. A transfer plate 187 is extended between the panels 18 and between the lower and transfer conveyers for guiding dough from the lower conveyer to the transfer conveyer.

A delivery belt conveyer 190 is extended around rollers 191 mounted in substantially horizontal, spaced, parallel relation between the side panels 166 having a receiving end 192 subjacent to the transfer conveyer discharge end 184, and a delivery end 193. A drive sprocket 194 is secured to the roller adjacent to the receiving end, and a driven sprocket 195 is secured to the other roller. A chain 196 extends around the drive sprocket of the delivery conveyer and the driven sprocket 186 of the transfer conveyer 175.

A pair of substantially horizontal, final sheeting rolls 198 are rotatably journaled between the panels 166 on trunnions 199 and in a position for receiving dough from the delivery conveyer 190. Meshing gears 200 are connected to the trunnions. A slide 201 is extended between the panels 166 and guides dough from the delivery conveyer to the final rolls. A duster 202 is mounted on the side panels 166 over the final rolls.

A first final belt conveyer 206 is extended around spaced upper rollers 207 and 208 and a lower roller 209 all of which are rotatably journaled in the panels 166. A driven sprocket 212, a drive sprocket 213 and a drive gear 214 are all secured to the roller 207. The drive gear is in mesh with one of the driven gears 200; and a chain 215 is extended around the drive sprocket 213 and the driven sprocket 195. The final conveyer has a receiving end 216 adjacent to the final rolls 198 so as to receive dough which has passed through the final rolls, and a delivery end 217. The final conveyer provides an upper run in a substantially horizontal plane below the upper run of the delivery conveyer 190. A chute 218 is extended between the panels in a position to guide dough from the final rolls onto the first final conveyer.

A second final conveyer 219 is extended around rollers 220, 221, and 222 arranged in triangular relation, as indicated in Figs. 4 and 5, so as to provide a receiving end 223 subjacent to the discharge end of the first final conveyer 206 and a downwardly sloped discharge end 224.

A non-inflammable, flexible perforate sifting conveyer 225 preferably of wire mesh is extended around an end sprocket 226 journaled in the side panels 166 below the discharge end 224 of the second final conveyer 219 and an end roller 227 journaled in a bracket 228 endwardly extended from the front frame section 13. Upper and lower intermediate rollers 229 are journaled in the side panels 166 between the end sprocket 226 and end roller 227 and beneath the upper and lower runs of the sifting conveyer. These rollers hold the center of the sifting conveyer upwardly relative to its ends. The sifting conveyer thus travels in a generally inverted V-shaped path of travel. Because of the disposition of the rollers, the sifting conveyer provides an upwardly inclined receiving portion adapted to receive dough discharged from the second final conveyer 219 and a downwardly declined portion.

A motor 230 is mounted on a platform 231 intermediate the ends of the frame section 13 on legs 160 and provides a drive gear 232 in mesh with a large wheel gear 233 secured to a shaft 234 rotatably mounted in the frame section 13. A sprocket 236 is secured to the shaft 234 on the opposite end thereof from the gear 233 and a chain 239 extends around this sprocket and the driven sprocket 212.

A drive sprocket 240 is secured to the roller 208, a drive sprocket 241 is secured to the roller 220, and a chain 242 is extended around the sprockets 240 and 241. Further, a drive sprocket 243 is secured to the roller 222, a driven sprocket 244 is secured to the end sprocket 226 of the sifting conveyer 225, and a chain 245 is extended around the sprockets 243 and 244. In this manner the second conveyer 219 and the sifting conveyer are driven by the motor 230.

An oven 250 is fragmentarily shown for receiving dough from the downwardly inclined portion of the sifting conveyer 225.

Operation

The operation of the described embodiment of the present invention is believed to be readily apparent and is briefly summarized at this point. Initially, the motors 125, 140 and 230 are energized to rotate the sheeting rolls 36, 76, 86, and 198; the conveyers 54, 69, 105, 175, 190, 206, and 209; and the sifting conveyer 225.

Dough balls 39, preferably of wheat flour dough, approximately one and three-fourths inches in diameter or about the size of a golf ball, are fed from the supply conveyer 40 into the primary rolls 36, as seen in Fig. 2. Each ball of dough is initially flattened by the primary rolls and deposited on the primary conveyer 54. Each ball of dough is thus pressed by the primary rolls into a substantially elliptical piece, indicated at 260, and by actual measurement has a major axis approximately four and one-half inches long and a minor axis approximately three and one-half inches wide. Obviously the specific dimensions depend in part on the size of the balls 39 and are not intended as limiting the invention but are mentioned and noted on the drawing merely as an aid in explaining a typical working situation. These elliptical pieces fall on the primary conveyer with their major axes disposed longitudinally thereof.

The primary conveyer 54 motivates each elliptical piece 260 to the discharge end 56 thereof where it is dropped onto the receiving end 71 of the lower or first intermediate conveyer 69, as also seen in Fig. 2 and in Fig. 3. Because of the angular relation between the conveyers 54 and 69, the elliptical piece of dough is disposed on the lower conveyer with its minor axis extended longitudinally of the lower conveyer. As the elliptical piece of dough drops from the conveyer 54 onto the conveyer 69, it flips over and is disposed on the conveyer 69 in inverted position. This avoids the utilization of a stopping mechanism, assures proper orientation, makes certain the pieces always are located properly with respect to the side edges of the conveyer 69, and facilitates desired ultimate shaping. The elliptical piece 260 is fed from the lower conveyer through the upper rolls 76. The minor axis of the dough piece is stretched out somewhat by the upper rolls and by measurement is found to be approximately five inches wide. The upper rolls also stretch out the major axis to a length of approximately five inches. The enlarged substantially circular piece, indicated at 261, slides down the chute 96 and enters the lower rolls 86. Here, again, the pieces 261 are made thinner and larger. After passing through the rolls 86, the dough piece, indicated at 262, is again of elliptical shape and has a major axis six and three-quarters inches long and a minor axis five and one-half inches wide.

In perfecting the machine of the present invention, one of the greatest difficulties encountered was that of maintaining the pieces of dough in proper orientation on their respective conveyers after having been elongated along predetermined axes. For example, when the elliptical pieces of dough moved from the conveyer 105 to the conveyer 175, it was desired to arrange the pieces with their major axes transversely of the conveyer 175, as shown in Fig. 1. However, as the pieces moved from the conveyer 105 with their major axes longitudinally thereof, their forward edges first to rest on the conveyer 175 were dragged along by the conveyer so that the major axes aligned longitudinally of the conveyer 175. A critical feature of the machine is that the conveyer 175 must travel at a speed much slower than the conveyer 105 or such dragging and turning action is encountered. For example, in a commercial machine of the present invention, the conveyer 105 is traveled at a velocity of approximately four-hundred twenty feet per minute while the conveyer 175 is traveled at fifty-five feet per minute. This is approximately the preferred relationship. In the same machine, the conveyer 190 travels at a velocity of one-hundred sixty feet per minute. While variations in these velocities can be accommodated, it is deemed critical that the velocity of the conveyer 175 be not greater than twenty percent of the velocity of the conveyer 105 and preferably should be approximately fifteen percent or less.

With continued reference to Figs. 1 and 3, the piece 262 is dropped onto the receiving end 110 of the lower conveyer 105 with its major axis longitudinally extended on the conveyer. Further, it is to be noted that the longitudinal or major axis lies substantially in a vertical plane longitudinally bisecting the lower conveyer. The piece 262 is moved from the discharge end 111 onto the receiving end of the transfer conveyer 175. By adjusting the speed of travel of the lower conveyer 105, the piece is caused to slide across the transfer plate 187 onto the receiving end 183 of the delivery conveyer with its minor axis disposed substantially precisely longitudinally of the conveyer. It is to be noted that the speed of the transfer conveyer is considerably less than the second intermediate conveyer 105 so as to minimize twisting of the piece on the transfer conveyer from a position with its minor axis aligned longitudinally of the conveyer.

With reference to Fig. 4, the transfer conveyer 175 feeds the piece 262 onto the delivery conveyer 190 which in turn feeds the piece into the final rolls 198 further to compress and flatten it. The major stretching of the dough occurs in the minor dimension or axis so as to give the piece 262 a substantially circular shape. The dough released from the final roll is thus a large, thin, substantially circular patty 263 and is found by measurement to be approximately eight inches in diameter. The first final conveyer 206 carries the circular patty to the second final conveyer 219 which carries it downwardly along the sloped delivery end 224 onto the sifting conveyer 225, as seen in Fig. 5. Excess flour which has been dusted on the dough from the dusters 116 and 202 is permitted to pass through the sifting conveyer to be collected for subsequent use. The sifting conveyer also functions to prevent folding of the forward and rearward edges of the patties. It has been found with conventional fabric belt conveyers that the forward and rearward edges of the patties sometimes tend to fold over when being discharged from the final conveyer to the oven. Because the sifting conveyer frictionally engages the patties without adhering thereto, this disadvantage is obviated. Further, the metallic sifting conveyer which protrudes into the oven 250 does not singe or burn as do conveyer belts of fabric or burnable substance.

From the foregoing, it will be apparent that a highly effective apparatus has been provided for forming smooth surfaced, substantially circular, thin, flat tortillas from substantially spherical balls of dough. The subject machine is excellently suited for making wheat flour tortillas although not limited thereto. The machine eliminates the hand forming of tortillas and the many disadvantages incident thereto. It has been found that the present invention enables the formation of approximately eighty tortillas a minute and that there is marked improvement in uniformity and texture of the finished product, It will be apparent, therefore, that the subject invention is highly effective for accomplishing its intended purposes.

While the subject invention has been described as principally intended for the formation of tortillas it is excellently suited to the formation of patties of dough as required for pizzas, pies and the like. The term tortillas as employed herein shall, therefore, be construed as including similarly shaped objects of dough independent of their specific purpose.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. An apparatus for forming a thin, substantially circular patty from a ball of dough comprising a support, primary roller means mounted in the support adapted to compress a ball of dough into predetermined substantially elliptical shape having major and minor dimensions, intermediate roller means mounted in the support, means mounted in the support for conveying the elliptically shaped dough from the primary roller means through the intermediate roller means longitudinally of the minor dimension thereof further to compress the dough into substantially elliptical shape of increased size and decreased thickness, final roller means mounted in the support, means for motivating the elliptically formed dough from the intermediate roller means to the final roller means for passage through the final roller means longitudinally of the minor dimension of the dough as formed by the intermediate roller means, said final roller means compressing the dough into thin, substantially circular form, said roller means each including a pair of rolls disposed in adjacent parallel relation having predetermined axes of rotation disposed in a common plane and adjacent peripheral portions, the plane of the rolls of the primary roller means being approximately horizontal and the planes of the rolls of the successive roller means being progressively more inclined with that of the final roller means being approximately vertical, and means having driving connection to the rolls rotating the rolls of each pair in opposite directions so as to travel the adjacent peripheral portions thereof in a direction common to the direction of dough progression through the apparatus.

2. An apparatus for making a flat, thin, substantially circular piece of dough from a ball thereof comprising a frame; a first pair of rolls mounted in the frame for rotation about approximately horizontal axes adapted to roll a mass of dough into a first elliptical piece having major and minor axes; a second pair of rolls mounted in the frame in spaced relation to the first pair of rolls for rotation about approximately horizontal axes; means supported in the frame for conveying the first elliptical piece of dough from the first rolls to the second rolls and for orienting the elliptical piece to feed it through the second pair of rolls longitudinally of its minor axis whereby the second pair of rolls compresses the dough into a second approximately circular piece larger than the first such piece; a third pair of rolls mounted in the frame adjacent to the second pair of rolls for rotation about approximately horizontal axes; means supported in the frame for conveying said second circular piece of dough from the second pair of rolls to the third pair of rolls for passage through the latter whereby the dough is again compressed into a third elliptical piece larger than the first piece; a fourth pair of rolls mounted in the frame in spaced relation to the third pair of rolls for rotation about approximately horizontal axes; an intermediate conveyer mounted in the frame for travel at a predetermined rate of speed providing a receiving end beneath the third pair of rolls for receiving said third elliptical piece with its major axis disposed longitudinally of the conveyer, and a discharge end; a transfer conveyer mounted in the frame for travel normal to the intermediate conveyer and at a rate of speed reduced to such a fraction of the speed of the intermediate conveyer that no appreciable distortion occurs in transfer providing a receiving end slightly below the discharge end of the intermediate conveyer for receiving said third elliptical piece with its major axis disposed transversely of the transfer conveyer, and a discharge end; and means supported in the frame for receiving said third piece of dough from the transfer conveyer and for conveying it into the fourth pair of rolls longitudinally of its minor axis further to compress the dough into a thin approximately circular piece, the first pair of rolls being horizontally adjacent to each other and the successive sets of rolls being of progressively increased inclination in the direction of dough travel.

3. An apparatus for forming a thin, substantially circular patty from a ball of dough comprising a support; primary roller means mounted in the support adapted to compress a ball of dough into elliptical shape having major and minor dimensions; intermediate roller means mounted in the support; means mounted in the support for conveying the elliptically shaped dough from the primary roller means through the intermediate roller means longitudinally of the minor dimension thereof further to compress the dough into elliptical shape of increased size and decreased thickness; final roller means mounted in the support; and means for motivating the elliptically formed dough from the intermediate roller means to the final roller means for passage through the final roller means longitudinally of the minor dimension of the dough as formed by the intermediate roller means, said final roller means compressing the dough into thin, approximately circular form.

4. In a sheeting apparatus in which it is desired to transfer flat pieces of dough from a primary conveyer, on which the pieces have predetermined orientation with respect to the direction of travel of said conveyer, to a second conveyer with the pieces of dough disposed thereon in positions having approximately the same orientation with respect to a line transversely of the direction of travel of said second conveyer; the combination of an elongated primary endless conveyer having an upper run providing predetermined receiving and discharging ends, means for delivering pieces of dough to the receiving end of the primary conveyer in predetermined orientation with respect to said conveyer, an elongated secondary endless conveyer substantially right angularly extended from the primary conveyer subjacent to the discharge end thereof and having an upper run positioned to receive pieces of dough from the discharge end of the primary conveyer, and drive means connected to the conveyers for moving the upper run of the first conveyers from the receiving end to the discharging end thereof at a predetermined speed and for moving the upper run of the secondary conveyer away from the primary conveyer at a speed reduced to such a fraction of the speed of the primary conveyer that no appreciable turning of the pieces of dough occurs during the transfer, the dough delivering means delivering the pieces of dough to the primary conveyer in such time spaced sequence that the pieces of dough are disposed in spaced relation on both conveyers.

5. The combination of claim 4 in which the drive means moves the secondary conveyer at a speed approximately twenty percent of the speed of movement of the primary conveyer.

6. The combination of claim 4 in which a further conveyer is provided in alignment with the secondary conveyer having a receiving end adapted to receive the pieces of dough from the secondary conveyer having driven connection with the drive means and moved thereby at approximately the same speed as the primary conveyer.

7. An apparatus for forming flat, thin, circular patties from balls of dough comprising a frame, a pair of cylindrical sheeting rolls mounted in the frame for rotation about horizontal axes disposed in a common horizontal plane and having adjacent peripheral portions, means having driving connection to the rolls rotating the rolls in opposite direction whereby the adjacent peripheral portions of the rollers are traveled downwardly, a dough supply conveyer mounted in the frame above the rolls adapted to discharge balls of dough for gravitational descent between the rolls whereby the rolls compress the balls into elliptical pieces having major and minor axes and discharge said pieces from the rolls with their major axes downwardly extended, an endless conveyer having an upper run disposed beneath the rolls and traveled laterally of the axes of the rolls to receive said elliptical pieces and to drag said pieces into substantial longitudinal alignment of their major axes with the direction of movement of the conveyer, a second endless conveyer right angularly extended from the first conveyer subjacent to the discharge end thereof and having an upper run adapted to receive elliptical pieces of dough from the first conveyer, drive means connected to the conveyers traveling the upper run of the first conveyer from the sheeting rolls to the second conveyer at a predetermined speed and traveling the upper run of the second conveyer away from the first conveyer at a speed which is reduced to such a fraction of the speed of the upper run of the first conveyer that no appreciable distortion of the pieces of dough occurs in transfer, a third conveyer aligned with said second conveyer having an upper run adapted to receive the elliptical pieces from the second conveyer with the major axes disposed longitudinally of said third conveyer, means driving the third conveyer with the upper run thereof traveled away from the second conveyer at a speed approximately equal to the speed of travel of the first conveyer, and further sheeting rolls adapted to receive the elliptical pieces into thin, flat, circular patties from the third conveyer and to compress said pieces.

8. An apparatus for forming flat, thin, circular patties from balls of dough comprising a frame, a pair of sheeting rolls mounted in the frame for rotation about horizontal axes disposed in a common approximately horizontal plane and having adjacent peripheral portions, means having driving connection to the rolls rotating the rolls in opposite direction whereby the adjacent peripheral portions of the rollers are traveled downwardly, a dough supply conveyer mounted in the frame above the rolls adapted to discharge balls of dough for gravitational descent between the rolls whereby the rolls compress the balls into elliptical pieces having major and minor axes and discharge said pieces from the rolls with their major axes downwardly extended, an endless conveyer having an upper run disposed beneath the rolls and traveled laterally of the axes of the rolls to receive said elliptical pieces and to drag said pieces into substantial longitudinal alignment of their major axes with the direction of movement of the conveyer, a second endless conveyer right angularly extended from the first conveyer subjacent to the discharge end thereof and having an upper run adapted to receive elliptical pieces of dough from the first conveyer, drive means connected to the conveyers traveling the upper run of the first conveyer from the sheeting rolls to the second conveyer at a predetermined speed and traveling the upper run of the second conveyer away from the first conveyer at a speed approximately twenty percent of the speed of the upper run of the first conveyer, a third conveyer aligned with said second conveyer having an upper run adapted to receive the elliptical pieces from the second conveyer with the major axes disposed longitudinally of said third conveyer, means driving the third conveyer with the upper run thereof traveled away from the second conveyer at a speed approximately equal to the speed of travel of the first conveyer, and further sheeting rolls adapted to compress the elliptical pieces into thin, flat, circular patties and to deliver said patties at a predetermined point of discharge for transfer to an oven, the successive pairs of sheeting rolls being arranged in progressively inclined spaced relation in the direction of travel of the dough pieces.

References Cited in the file of this patent

UNITED STATES PATENTS

| | | |
|---|---|---|
| 1,221 | Mason | July 6, 1839 |
| 806,869 | Burns | Dec. 12, 1905 |
| 1,312,094 | Baker et al. | Aug. 5, 1919 |
| 1,759,608 | Ehrhart | May 20, 1930 |
| 2,119,910 | Ferry | June 7, 1938 |
| 2,352,135 | Streit | June 20, 1944 |